(12) United States Patent
Oda et al.

(10) Patent No.: US 9,539,586 B2
(45) Date of Patent: Jan. 10, 2017

(54) AIR PURIFIER

(75) Inventors: Kohei Oda, Kyoto (JP); Takahisa Kusuura, Kanagawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1112 days.

(21) Appl. No.: 13/641,095

(22) PCT Filed: Jul. 6, 2011

(86) PCT No.: PCT/US2011/043053
§ 371 (c)(1),
(2), (4) Date: Oct. 12, 2012

(87) PCT Pub. No.: WO2013/006169
PCT Pub. Date: Jan. 10, 2013

(65) Prior Publication Data
US 2013/0042756 A1    Feb. 21, 2013

(51) Int. Cl.
*B03C 3/16* (2006.01)
*B03C 3/47* (2006.01)
*B01D 47/02* (2006.01)
*B01D 19/02* (2006.01)

(52) U.S. Cl.
CPC .............. *B03C 3/47* (2013.01); *B01D 19/02* (2013.01); *B01D 47/021* (2013.01); *B03C 3/16* (2013.01)

(58) Field of Classification Search
CPC combination set(s) only.
See application file for complete search history.

(56) References Cited

U.S. PATENT DOCUMENTS 3,958,959 A * 5/1976 Cohen ................ B03C 3/01
                                                239/696
3,959,112 A   5/1976 Arend, Jr.
4,085,170 A * 4/1978 Simpson ............ B01D 11/02
                                                261/1

(Continued)

FOREIGN PATENT DOCUMENTS

JP    58-049494      3/1983
JP    03-288518     12/1991

(Continued)

OTHER PUBLICATIONS https://www.highbeam.com; Nov. 25, 2004; Pacific Research Consulting, Inc.; Cosmetics & Toiletries & Household Products Marketing News in Japan; "Nano Planet Research Center Launches Micro Bubble Maker"; p. 1/1.*

(Continued)

*Primary Examiner* — Duane Smith
*Assistant Examiner* — Sonji Turner
(74) *Attorney, Agent, or Firm* — Dorsey & Whitney LLP

(57) ABSTRACT

An air purifier is disclosed having a bubble generator configured to generate fine air bubbles with a diameter of about 50 μm or less and a negative electrical charge. The bubble generator is coupled to an air purification tank, which contains a liquid for purifying the air within the air bubbles, by dissolving impurities. The tank also has a positive electrode disposed within the liquid. The positive electrode is configured to attract the negatively charged air bubbles, thereby promoting defoaming and increasing the air throughput rate.

26 Claims, 11 Drawing Sheets

(56) References Cited

U.S. PATENT DOCUMENTS

| | | | | |
|---|---|---|---|---|
| 4,624,745 A | * | 11/1986 | Sande | B01D 19/02 162/252 |
| 4,732,661 A | * | 3/1988 | Wright | C02F 1/46104 204/278.5 |
| 4,908,109 A | * | 3/1990 | Wright | C02F 1/46104 204/278.5 |
| 5,879,317 A | | 3/1999 | Plunkett | |
| 6,382,601 B1 | * | 5/2002 | Ohnari | B01F 3/0446 261/123 |
| 6,579,343 B2 | * | 6/2003 | Brennecke | B01D 53/1493 95/231 |
| 6,607,579 B2 | * | 8/2003 | Willey | B03C 3/16 502/172 |
| 6,607,586 B2 | * | 8/2003 | Willey | B03C 3/16 502/172 |
| 6,656,253 B2 | * | 12/2003 | Willey | B03C 3/16 96/27 |
| 6,843,835 B2 | | 1/2005 | Fornai et al. | |
| 7,261,283 B1 | * | 8/2007 | Ohnari | B01F 3/0446 261/79.2 |
| 7,472,893 B2 | * | 1/2009 | Ohnari | B01F 3/0446 261/108 |
| 7,531,027 B2 | * | 5/2009 | Tepper | B03C 3/08 95/71 |
| 7,717,980 B2 | * | 5/2010 | Tepper | B03C 3/16 95/71 |
| 8,016,993 B2 | * | 9/2011 | Hoenig | B01D 1/26 204/265 |
| 2002/0185004 A1 | * | 12/2002 | Willey | B03C 3/16 95/65 |
| 2003/0079608 A1 | * | 5/2003 | Willey | B03C 3/0175 96/43 |
| 2003/0196552 A1 | * | 10/2003 | Willey | B03C 3/16 96/44 |
| 2004/0089156 A1 | * | 5/2004 | Gartstein | B03C 3/16 96/53 |
| 2006/0054205 A1 | * | 3/2006 | Yabe | A61L 2/02 134/184 |
| 2006/0185511 A1 | * | 8/2006 | Tepper | B03C 3/16 95/71 |
| 2007/0084713 A1 | | 4/2007 | Deep et al. | |
| 2007/0267763 A1 | * | 11/2007 | Ohnari | B01F 3/0446 261/79.2 |
| 2008/0121106 A1 | * | 5/2008 | Tepper | B03C 3/08 96/27 |
| 2008/0271603 A1 | | 11/2008 | Triplett et al. | |
| 2009/0088485 A1 | * | 4/2009 | Van Dijk | B01D 19/0005 516/115 |
| 2011/0000368 A1 | * | 1/2011 | Tollens | B03C 3/025 95/62 |
| 2011/0000369 A1 | * | 1/2011 | Tollens | B03C 1/16 95/62 |

FOREIGN PATENT DOCUMENTS

| | | | | |
|---|---|---|---|---|
| JP | 05-285420 | | 11/1993 | |
| JP | 2002126482 A | * | 5/2002 | |
| JP | 2003093858 A | * | 4/2003 | |
| JP | 2003220331 A | * | 8/2003 | |
| JP | 2006116365 A | * | 5/2006 | |
| JP | 2008043906 A | * | 2/2008 | |
| JP | 2009-082923 | | 4/2009 | |
| JP | 2009082923 A | * | 4/2009 | |
| WO | WO 2004030837 A1 | * | 4/2004 | A61L 2/02 |
| WO | WO 2007/008491 | | 1/2007 | |
| WO | WO 2011002966 | * | 1/2011 | B03C 1/16 |

OTHER PUBLICATIONS

"Method of Generating Micro Bubbles," http://staff.aist.go.jp/m.taka/RS_Generation_methods_of_MB.html; Information was available at website: http://staff.aist.go.jp/m.taka/RS_Generation_methods_of_MB.html; in some form no later than Nov. 24, 2010. While the website as it existed on Nov. 24, 2010, is not in Applicant's possession, Applicant has provided the website that was printed on Oct. 31, 2011.

"What are Nano Bubbles of Kyowa Kisetsu," Kyowa Kisetsu Co., Ltd., Information was available at website: http://www.kyowakisetsu.co.jp/kyowanano.html; in some form no later than Nov. 24, 2010. While the website as it existed on Nov. 24, 2010 is not in Applicant's possession, Applicant has provided the website that was printed on Oct. 11, 2012.

Goto, "Study on generation and function on nano bubbles," http://www.iit.tsukuba.ac.jp/thesis/H15syuron/200205288.pdf, Jan. 2004, 58 pages.

Makuta, "Hollow microcapsules directly produced from micro bubbles and their application," Briefing material of Assistant Professor Toshinori Makuta, Department of Mechanical Systems Engineering, May 21, 2010, 22 pages.

Ohnari, "Extending the application of micro bubbles," Presentation of study by Professor Hirohumi Ohnari, http://www.coip.jp/modules/wordpress/index.php?p=55, Tokuyama College of Technology.

"Micro-Nano Bubbles," Riverforest Corporation, http://riverforestcorp.com/MicroNano%20Bubbles%20General%20and%20Possible%20Applications.pdf; May 14, 2008, pp. 1-10.

"Micro Bubble," (from Wikipedia), Information was available at website: http://ja.wikipedia.org/wiki/%E3%83%9E%E3%82%A4%E3%82%AF%E3%83%AD%E3%83%90%E3%83%96%E3%83%AB; in some form no later than Nov. 24, 2010. While the website as it existed on Nov. 24, 2010 is not in Applicant's possession, Applicant has provided the website that was printed on Dec. 16, 2011.

"Micro Bubble," (from Wikipedia), Information was available at website: http://ja.wikipedia.org/wiki/%E3%83%9E%E3%82%A4%E3%82%AF%E3%83%AD%E3%83%90%E3%83%96%E3%83%AB; in some form no later than Nov. 24, 2010. While the website as it existed on Nov. 24, 2010 is not in Applicant's possession, Applicant has provided the website that was printed on Oct. 12, 2012.

Beattie, "Comment on Autoionization at the Surface of Neat Water: is the Top Layer pH Neutral, Basic, or Acidic?" Phys. Chem. Chem. Phys., 2008, pp. 330-331, vol. 9 (4736).

Graciaa et al., "Electrokinetics of Bubbles," Encyclopedia of Surface and Colloid Science, 2002, vol. 2, pp. 1876-1886.

International Search Report and Written Opinion received in International Application No. PCT/US2011/043053, dated Oct. 12, 2011, filed on Jul. 6, 2011.

Ohnari, "Characteristics and possibilities of micro bubble technology," Professor Hirohumi Ohnari, Tokuyama College of Technology, Journal of MMIJ, 2007, pp. 89-96, vol. 123 (3).

* cited by examiner

AIR PURIFIER

CROSS-REFERENCE TO RELATED APPLICATION

This application is the U.S. national phase entry under 35 U.S.C. §371 of PCT/US2011/043053, filed on Jul. 6, 2011, the entire disclosure of which is hereby incorporated by reference herein.

BACKGROUND

Unless otherwise indicated herein, the materials described in this section are not prior art to the claims in this application and are not admitted to be prior art by inclusion in this section.

Recently, technology for purifying indoor air has attracted public attention in accordance with the increase of contemporary airtight houses and buildings and widespread viruses hazardous to human health, such as SARS and influenza viruses. This has led to active research for improving indoor conditions by removing microparticles in air, such as cigarette smoke and pollen, and hazardous gases, such as volatile organic compounds (VOCs).

Air purifiers that are widely used have a common structure, which intakes indoor air and removes microparticles in the air with filters. Many of these filters include "solid" filters, which may be activated charcoal and/or high efficiency particulate air (HEPA) filters which is a type of air filter that satisfies standards of efficiency set by the United States Department of Energy (DOE). In these purifiers, the filters themselves are expensive and have to be periodically replaced in order to sustain the performance, and thus, they can be costly to operate. Alternatively, air purifiers using liquid, such as water, which removes pollutants in the air, have been proposed. These purifiers are able to remove hazardous gases, VOCs, etc., in addition to dust, cigarette smoke, viruses, and bacteria. Thus, these purifiers can be more versatile than the "solid" filters.

Air purifiers using liquid can be classified into two types, based on their operating principle. One is a spray type which involves spraying liquid into air, and the other is a bubble type which involves dispersing air into liquid as air bubbles.

SUMMARY

In some embodiments, air purifying systems include a fine air bubble generator, a tank containing liquid (e.g., water) for purifying air by dissolving impurities in the fine air bubbles, and a positive electrode disposed within the tank for defoaming the fine air bubbles after purification. Also provide herein are methods and tanks configured to carry out the efficient cleansing of air using micro/nano scale fine air bubbles with electrode-assisted defoaming to enhance air throughput.

In some embodiments, the air purifier system contains an air intake vent to introduce air to be purified into the device. The air purifier also contains a bubble generator coupled to the air intake vent and further containing a generator outlet port. In some embodiments, the bubble generator generates air bubbles having a diameter of about 50 µm or less and a negative electrical charge. In some embodiments, the air purifier contains a liquid tank. In some embodiments, the liquid tank contains a liquid for purifying the air within the air bubbles by dissolving impurities. In some embodiments, the liquid tank contains a tank inlet port coupled to the generator outlet port of the bubble generator. The liquid tank also contains a positive electrode disposed within the liquid. The positive electrode takes a role in attracting the negatively charged air bubbles.

In some embodiments, a method of purifying air involves introducing air to be purified into a bubble generator, generating air bubbles having a diameter of about 50 µm or less from the air, releasing the air bubbles into a liquid in a liquid tank, wherein impurities in the air within the air bubbles are absorbed into the liquid, attracting the negatively charged air bubbles to a positive electrode, and allowing the attracted air bubbles coalesced into larger air bubbles.

In some embodiments, an air purifier tank, which holds a liquid, has a tank inlet port coupled to a bubble generator capable of generating fine, micro/nano scale, air bubbles. In some embodiments, the air purifier tank also contains a positive electrode disposed within the tank. In this configuration, the positive electrode attracts the negatively charged air bubbles and allows the attracted air bubbles coalesced into larger air bubbles.

An air purifier is disclosed in accordance with some embodiments. The air purifier includes: an air intake vent; a bubble generator coupled to the air intake vent and further including a generator outlet port, where the bubble generator is configured to generate air bubbles having a diameter of about 50 µm or less and a negative electrical charge; a liquid tank including a liquid (e.g., water) for purifying the air within the air bubbles by dissolving impurities and a tank inlet port which is coupled to the generator outlet port of the bubble generator; a positive electrode disposed within the liquid, where the positive electrode is configured to attract the negatively charged air bubbles. In a variation, the bubble generator is configured to generate air bubbles having a diameter of about 1 µm or less.

In some embodiments, the bubble generator includes: an injector coupled to the air intake vent and configured to inject air into the liquid to generate air bubbles suspended within the liquid; and one or more pivotal plates disposed within a flow path of the air bubbles suspended within the liquid, such that a vortex is generated.

In other embodiments, the bubble generator includes: a compressor configured to compress the air from the air intake vent; a pump configured to introduce the liquid from the liquid tank into the bubble generator; and a pressure tank coupled to the compressor and the pump, where the pressure tank includes a nozzle configured to disperse the compressed air in the form of air bubbles into the liquid.

In other embodiments, the bubble generator may include a porous nozzle having a microporous membrane disposed within the liquid and configured to release the air in the form of microbubbles dispersed within the liquid. The bubble generator may also include a nozzle configured to disrupt the vortex to generate microbubbles.

In other embodiments, the bubble generator also includes a supersonic wave generator configured to generate supersonic waves to collapse the air bubbles into air bubbles with smaller diameters. The supersonic waves may cause cavitations.

In some embodiments of the air purifier, the liquid tank may include one or more stirring elements configured to circulate the liquid. The liquid tank may also include a water jet system configured to introduce external liquid into the liquid tank to circulate the liquid. The liquid tank may also include a gas inlet port configured to introduce external gas into the liquid tank to circulate the liquid. In another embodiment, the liquid tank includes a pump configured to circulate the liquid. In another embodiment, the liquid tank includes a supersonic vibrator configured to vibrate the liquid. In another embodiment, the liquid tank includes a heater configured to cause a convective flow to circulate the liquid. The liquid tank may have a circular cross section, and the tank inlet port may be configured to introduce the air bubbles in a tangential direction to the circular cross section.

In some embodiments of the air purifier, the positive electrode includes one or more slits. The width of the one or more slits may be smaller than $1\times10^{-2}$ m. In another embodiment, the positive electrode includes one or more holes. The diameter of the one or more holes may be smaller than $1\times10^{-2}$ m. In another embodiment, the positive electrode includes a planer mesh. In another embodiment, the positive electrode includes a spherical mesh. In another embodiment, the positive electrode includes one or more pins. In another embodiment, the positive electrode includes a honeycomb mesh. In another embodiment, the positive electrode includes metallic nonwoven fabric.

In another embodiment, the positive electrode may include a material selected from the group consisting of gold (Au), silver (Ag), copper (Cu), platinum (Pt), aluminum (Al), nickel (Ni), titanium (Ti), zinc (Zn), chromium (Cr), tungsten (W), iron (Fe), tin (Sn), lead (Pb), cobalt (Co), molybdenum (Mo), iridium (Ir), indium (In), ruthenium (Ru), rhodium (Rh), cadmium (Cd), palladium (Pd), graphite, carbon, diamond, indium tin oxide (ITO), zinc oxide (ZnO) and a combination thereof.

In some embodiments of the air purifier, the liquid tank may also be coupled to a negative terminal. In some embodiments, the bottom of the liquid tank is coupled to the negative terminal. In other embodiments, a side of the liquid tank is coupled to the negative terminal. In other embodiments, the whole portion of the liquid tank is coupled to the negative terminal. In some embodiments, the liquid tank may also include a negative electrode. The negative electrode may be the bottom of the tank, the side of the tank, or, in some embodiments, the whole tank.

In some embodiments, the liquid tank may include a material selected from the group consisting of plastic, gold (Au), silver (Ag), copper (Cu), platinum (Pt), aluminum (Al), nickel (Ni), titanium (Ti), zinc (Zn), chromium (Cr), tungsten (W), iron (Fe), tin (Sn), lead (Pb), cobalt (Co), molybdenum (Mo), iridium (Ir), indium (In), ruthenium (Ru), rhodium (Rh), cadmium (Cd), palladium (Pd), graphite, carbon, diamond, indium tin oxide (ITO), zinc oxide (ZnO) a steel alloy, an alloy of aluminum and magnesium, die-castings, and combinations thereof.

In some embodiments, the air purifier may include a device for adjusting the potential of the positive electrode, thereby controlling the rate of attracting air bubbles.

A method of purifying air is disclosed in accordance with other embodiments. The method includes the steps of: introducing air to be purified into a bubble generator; generating negatively charged air bubbles having a diameter of about 50 µm or less from the air; releasing the air bubbles into a liquid in a liquid tank, wherein impurities in the air within the air bubbles are absorbed into the liquid; attracting the negatively charged air bubbles to a positive electrode; and allowing the air bubbles coalesced into larger air bubbles.

In a variation to the method of purifying air, the diameter of the air bubbles may be 1 µm or less.

In another variation to the method of purifying air, the step of generating negatively charged air bubbles may also include generating a vortex of air bubbles suspended in liquid and subsequently disrupting the vortex to create microbubbles. In one embodiment, the step of disrupting the vortex may be accomplished by using a break-down nozzle in order to generate the air bubble.

In another variation to the method of purifying air, the step of generating negatively charged air bubbles may also include: compressing the air; merging the compressed air and the liquid to disperse a portion of the compressed air in the liquid; and releasing the compressed air as air bubbles dispersed in the liquid. In a variation, the air bubbles may be released through a microporous membrane of a porous nozzle.

In one embodiment, the method of purifying air also includes a step of generating supersonic waves to collapse the air bubbles into air bubbles with smaller diameters. The supersonic waves may cause cavitations.

In another embodiment of the method of purifying air, the method includes a further step of circulating the liquid in the liquid tank around the positive electrode. The step of circulating the liquid in the liquid tank around the positive electrode may be executed by one or more propellers in the liquid tank. The step of circulating the liquid in the liquid tank around the positive electrode may also include a step of introducing external liquid into the liquid tank to circulate the liquid. The step of circulating the liquid in the liquid tank around the positive electrode may also include introducing external gas into the liquid tank to circulate the liquid. Alternatively, the liquid may be circulated around the positive electrode by a pump attached to the liquid tank. In other variations, the liquid may be circulated around the positive electrode by vibrating the liquid in the tank, or by heating the liquid to cause a convective flow in the liquid in the tank.

In one embodiment of the method of purifying air, the liquid tank has a circular cross section, and the step of releasing the air bubbles also includes releasing the air bubbles into the liquid tank in a direction tangential to the circular cross section.

In a further variation, the method of purifying air may also include adjusting a potential of the positive electrode thereby controlling a speed of adsorbing the air bubbles.

In some embodiments of the method of purifying air, the liquid is water.

An air purifier tank is disclosed in accordance with one embodiment of the invention. The air purifier tank is configured to hold a liquid. The tank has a tank inlet port configured to couple with a bubble generator capable of generating negatively charged air bubbles. The tank also has a positive electrode disposed within the tank, where the positive electrode is configured to attract the negatively charged air bubbles.

In variations to the tank, one or more propellers configured to circulate the liquid are included. In further variations, the tank includes a water jet system configured to introduce external liquid into the liquid tank to circulate the liquid. In other embodiments, the tank may include: a gas inlet port configured to introduce external gas into the liquid tank to circulate the liquid; a pump configured to circulate the liquid; a supersonic vibrator configured to vibrate the liquid; and/or a heater configured to cause a convective flow to circulate the liquid. In one variation, the tank has a circular cross section and wherein the tank inlet port is configured to introduce the air bubbles in a tangential direction to the circular cross section.

In another variation, the positive electrode of the air purifier tank may include one or more slits configured to allow air bubbles to pass therethrough. The one or more slits may have a width smaller than $1\times10^{-2}$ m. Alternatively, the positive electrode of the air purifier tank may include one or more holes configured to allow air bubbles to pass therethrough. The diameter of the one or more holes is smaller than $1\times10^{-2}$ m. In another variation, the positive electrode may be in the form of a planer mesh configured to allow air bubbles to pass therethrough. In another variation, the positive electrode may be in the form of a spherical mesh configured to allow air bubbles to pass therethrough. In another variation, the positive electrode may be in the form of one or more pins configured to attach air bubbles. In another variation, the positive electrode may be in the form of a honeycomb mesh configured to allow air bubbles to pass therethrough. In another variation, the positive electrode may be in the form of metallic nonwoven fabric configured to allow air bubbles to pass therethrough.

The positive electrode of the air purifier tank may include gold (Au), silver (Ag), copper (Cu), platinum (Pt), aluminum (Al), nickel (Ni), titanium (Ti), zinc (Zn), chromium (Cr), tungsten (W), iron (Fe), tin (Sn), lead (Pb), cobalt (Co), molybdenum (Mo), iridium (Ir), indium (In), ruthenium (Ru), rhodium (Rh), cadmium (Cd), palladium (Pd), graphite, carbon, diamond, indium tin oxide (ITO), zinc oxide (ZnO) and a combination thereof.

In some embodiments, the air purifier tank may also include a negative terminal. The tank may include a bottom coupled to the negative terminal, and/or a side coupled to the negative terminal. In some embodiments, the whole portion of the air purifier tank may be coupled to the negative terminal. In another variation, the tank may include a negative electrode. The negative electrode may be included on the bottom, side or whole portion of the tank.

The air purifier tank may include one of more of the following materials: plastic, gold (Au), silver (Ag), copper (Cu), platinum (Pt), aluminum (Al), nickel (Ni), titanium (Ti), zinc (Zn), chromium (Cr), tungsten (W), iron (Fe), tin (Sn), lead (Pb), cobalt (Co), molybdenum (Mo), iridium (Ir), indium (In), ruthenium (Ru), rhodium (Rh), cadmium (Cd), palladium (Pd), graphite, carbon, diamond, indium tin oxide (ITO), zinc oxide (ZnO) a steel alloy, an alloy of aluminum and magnesium, die-castings, and combinations thereof.

In one embodiment, the tank further includes a device for adjusting a potential of the positive electrode thereby controlling a speed of attracting the air bubbles.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
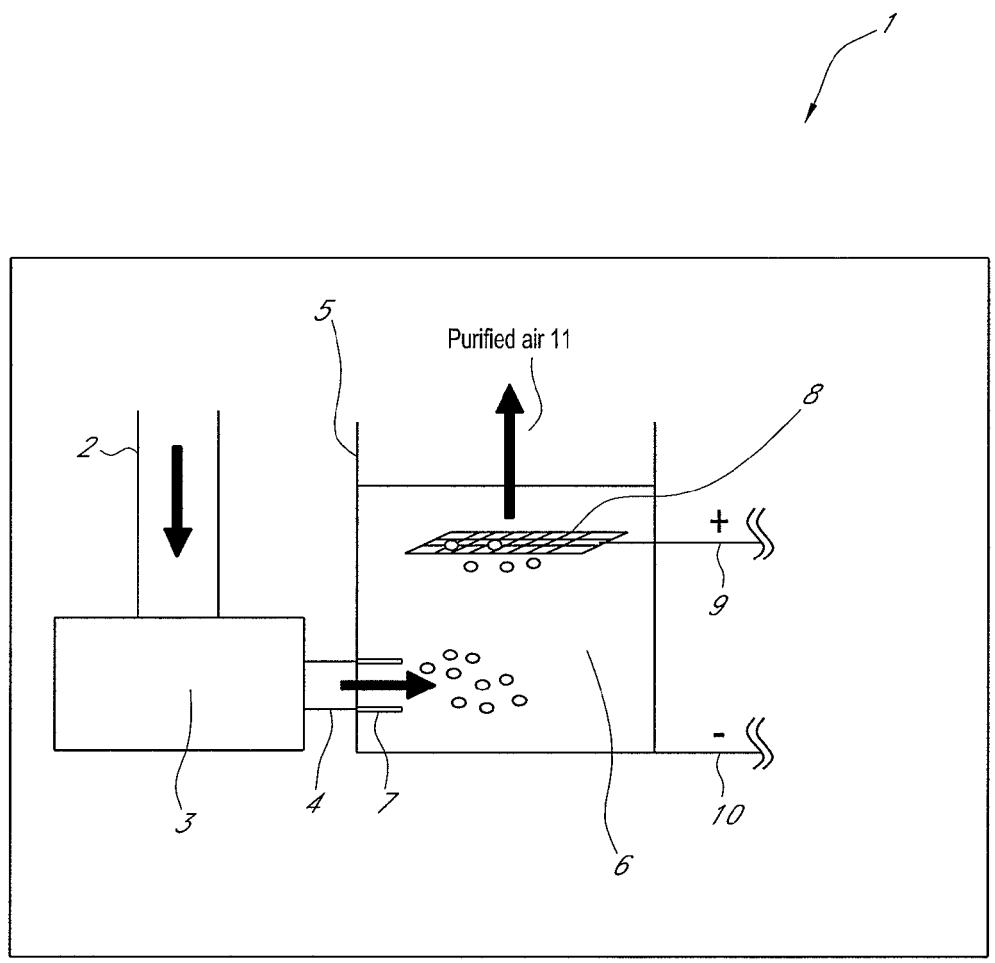
FIG. 1 is a schematic side view of an embodiment of an air purifier system including a bubble generator, a liquid tank and a positive electrode.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Generally disclosed herein are air purifiers that disperse air into liquid as air bubbles. Such air purifiers adopt a relatively simple strategy in which air in the form of fine air bubbles is fed into the water so that the water may be able to trap pollutants, including particulate materials suspended in the air, such as dust, cigarette smoke, viruses, mold, fungus, and bacteria, as well as hazardous gases, VOCs, etc., contained in the air. To enhance a cleansing effect, larger areas of gas-liquid contact is desirable. For this reason, it is advantageous to produce air bubbles that are as fine as possible. However, as air bubbles become finer, the buoyant forces applied to the air bubbles from the surrounding liquid decrease, and interfacial tension effects of the air bubbles become more dominant. These small buoyant forces and dominant interfacial tension effects result in increased stability of the air bubbles in the liquid which keeps the air bubbles suspended in the water for a long period of time. For example, an air bubble having the diameter of 10 μm ascends only about 40-50 mm/second. This causes difficulty in directly extracting the air bubbles again as a mass of air, resulting in the lower air flow rate ("throughput"). In other words, there is a trade-off between improving the cleansing effectiveness and reducing the air throughput by using finer bubbles. This is a problem in bubble type air purifiers, due to the stability of smaller bubbles in the liquid, including e.g., "micro bubbles," "micro-nano bubbles" and nano bubbles. One solution to this problem has been to include an additional large liquid tank outside of the air purifier, solely dedicated to the defoamation process, to more closely match the speed of defoamation with the speed of air cleansing. This has been an obstacle to achieve a compact sized air purifier system.

Fine bubbles, in the micro/nano size range, exhibit colloidal properties when suspended in aqueous liquid and have a net negative charge at their surface. This results in the negatively-charged air bubbles repelling one another. Consequently, these fine air bubbles tend to remain stable as a colloidal suspension or foam. Aspects of the present disclosure are therefore directed to facilitating defoamation of fine, micro/nano scale, bubbles to enhance air throughput without compromising cleansing efficiency. In certain embodiments, a positively charged electrode is disposed within the liquid to attract the negatively charged bubbles. Further, in certain embodiments, the positively charged electrode is configured to promote the coalescence or merging of smaller bubbles into larger bubbles, thereby increasing bubble buoyancy and breaking the stable foam. The larger bubbles then rise more readily through the aqueous cleansing liquid (e.g., water), being released into the air.

This disclosure is further drawn to air purifiers with bubble generators. In certain embodiments, air purifying systems are disclosed that include a fine air bubble generator, a tank containing liquid (e.g., water) for purifying air by dissolving impurities in the fine air bubbles, and a positive electrode disposed within the tank for defoaming the fine air bubbles after purification. Also provide herein are methods and tanks configured to carry out the efficient cleansing of air using micro/nano scale fine air bubbles with electrode-assisted defoaming to enhance air throughput.

In some embodiments, the air purifier system contains an air intake vent to introduce air to be purified into the device. The air purifier also contains a bubble generator coupled to the air intake vent and further containing a generator outlet port. In some embodiments, the bubble generator generates air bubbles having a diameter of about 50 μm or less and a negative electrical charge. In some embodiments, the air purifier contains a liquid tank. In some embodiments, the liquid tank contains a liquid for purifying the air within the air bubbles by dissolving impurities. In some embodiments, the liquid tank contains a tank inlet port coupled to the generator outlet port of the bubble generator. The liquid tank also contains a positive electrode disposed within the liquid. The positive electrode takes a role in attracting the negatively charged air bubbles.

In some embodiments, a method of purifying air involves introducing air to be purified into a bubble generator, generating air bubbles having a diameter of about 50 μm or less from the air, releasing the air bubbles into a liquid in a liquid tank, wherein impurities in the air within the air bubbles are absorbed into the liquid, attracting the negatively charged air bubbles to a positive electrode, and allowing the air bubbles coalesced into larger air bubbles.

In some embodiments, an air purifier tank, which holds a liquid, has a tank inlet port coupled to a bubble generator capable of generating fine, micro/nano scale, air bubbles. In some embodiments, the air purifier tank also contains a positive electrode disposed within the tank. In this configuration, the positive electrode attracts the negatively charged air bubbles and allows the air bubbles coalesced into larger air bubbles.

Air Purifier

Referring to FIG. 1, a schematic side view of one embodiment of an air purifier 1 is illustrated. At least one air intake vent 2 of the air purifier 1 introduces air to the air purifier 1. The air purifier 1 also includes at least one bubble generator 3 coupled to the air intake vent 2 and contains at least one generator outlet port 4. The bubble generator 3 generates air bubbles, which may have a diameter of about 50 μm or less, so called "micro bubbles," and a negative electrical charge. In some embodiments, the diameter of the air bubbles may be about 1 μm or less, so called "nano bubbles". For efficient transfer of impurities in the air by dispersing the air in the liquid as fine air bubbles, the air was introduced in the form of the micro or nano bubbles, in order to significantly increase the area of the gas-liquid interfacial surface. Impurities, such as pollutants in the air can be efficiently transferred to the liquid by the increased area of the gas-liquid interfacial surface. In the illustrated embodiment, the generator outlet port 4 is coupled to a liquid tank 5, and the generated air bubbles are introduced to the liquid tank 5 from the generator outlet port 4.

The liquid tank 5 contains a liquid 6 for purifying the air by dissolving impurities. In some embodiments, the liquid tank contains at least one tank inlet port 7 coupled to the generator outlet port 4 of the bubble generator 3. At the tank inlet port 7, the air bubbles are dispersed and the air bubbles are exposed to the liquid 6 to efficiently transfer the impurities contained in the air bubbles to the liquid 6.

At least one positive electrode 8 is installed in the liquid tank 5, disposed within the liquid 6. The positive electrode 8 attracts the negatively charged air bubbles. In the illustrated embodiment the positive electrode 8 may be applied a positive potential, by coupling to a positive terminal 9. Further, the liquid tank 5 may be applied a negative potential by coupling to a negative terminal 10. As a result, the air bubbles with negative electrical charges are repelled from the liquid tank 5 and attracted to the positive electrode 8. Fine bubbles tend to be stable in liquid and are difficult to be defoamed into air again. However, with this configuration, the fine air bubbles are attracted to the positive electrode 8, where they coalesce into larger air bubbles, which float to the top of the liquid 6 and exit the tank as purified air 11. In this manner, the defoaming rate of fine bubbles can be significantly increased. In some embodiments, the air purifier using micro-nano bubbles can be compact and high-throughput.

Bubble Generator

Figure 2:
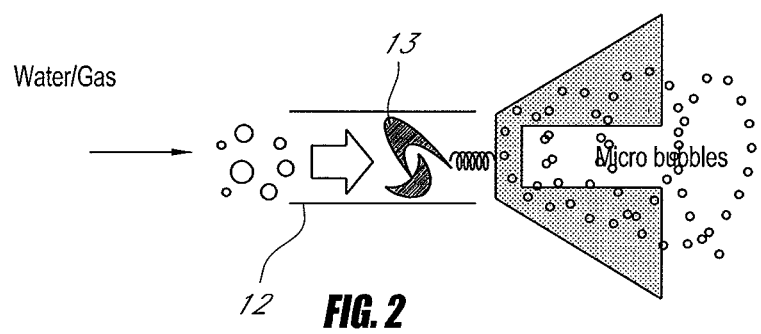
FIG. 2 is a schematic side view of one embodiment of the bubble generator with a pivotal plate.

The air bubbles in the liquid can have a variety of sizes. For example, the air bubbles can have average diameters of about 50 μm or less, about 40 μm or less, about 30 μm or less, about 20 μm or less, about 10 μm or less, about 5 μm or less, about 1 μm or less, about 100 nm or less. The air bubbles in the liquid can be generated in various ways. For example, one embodiment of the bubble generator is illustrated in FIG. 2, where an injector 12 is coupled to the air intake vent 2 (not shown) and injects air into the liquid to generate air bubbles suspended within the liquid, and one or more pivotal plates 13 are disposed within a flow path of the air bubbles suspended within the liquid, such that a vortex is generated. In this type of the bubble generator, air bubbles in a vortex flow collapse into finer bubbles when the vortex is broken. In FIG. 2, a vortex is generated by causing a mixture of liquid and a gas to vigorously collide with a fixed pivotal plate 13. When the vortex is broken, the air bubbles contained in it become finer, foaming micro bubbles.

Figure 3:
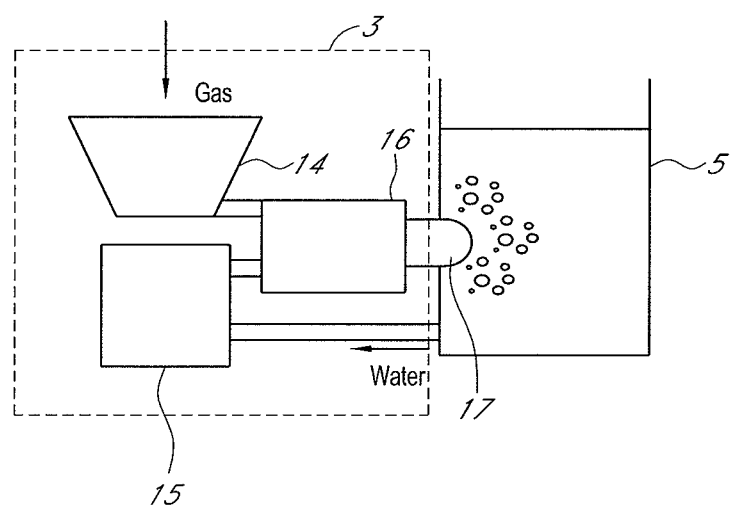
FIG. 3 is a schematic side view of one embodiment of the bubble generator with a compressor, a pump and a pressure tank.

Another embodiment of the bubble generator is illustrated in FIG. 3. A compressor 14 takes the air from the air intake vent 2 (not shown) and compresses the air, while a pump 15 introduces the liquid from the liquid tank 5 into the bubble generator 3. A pressure tank 16 is coupled to the compressor 14 and the pump 15 and the compressed air is introduced into the liquid. The pressure tank 16 comprises a nozzle 17 which disperses the compressed air in the form of air bubbles mixed with the liquid into the liquid tank 5.

Figure 4:
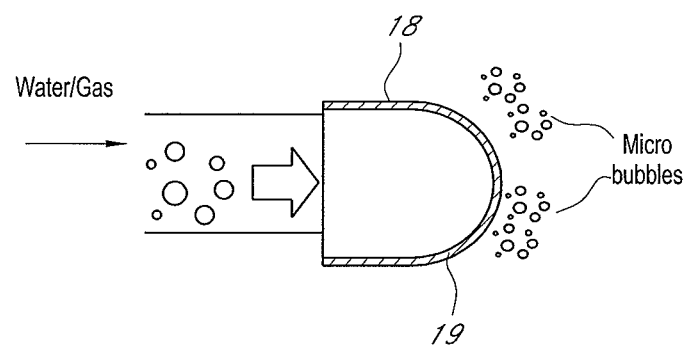
FIG. 4 is a schematic side view of one embodiment of the bubble generator with a porous nozzle having a microporous membrane.

In some embodiments, as illustrated in FIG. 4, the bubble generator may contain a porous nozzle 18 having a microporous membrane 19 disposed within the liquid. The porous nozzle 18 releases the air via microporous membrane 19 in the form of micro bubbles dispersed within the liquid.

Figure 5:
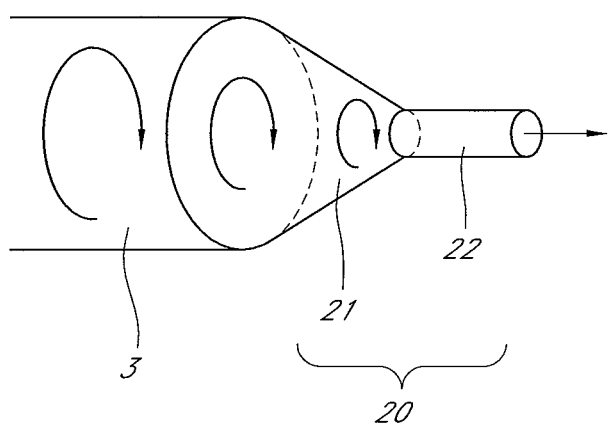
FIG. 5 is a schematic perspective view of one embodiment of the bubble generator with a nozzle containing a constriction section and a vortex disrupting section.

An alternative embodiment of the bubble generator is illustrated in FIG. 5. The bubble generator may contain a nozzle 20, where the nozzle 20 contains a constriction section 21 which constricts a mixture of the air and the liquid to cause the vortex, and a vortex disrupting section 22, which disrupts the vortex in order to generate micro bubbles.

Figure 6:
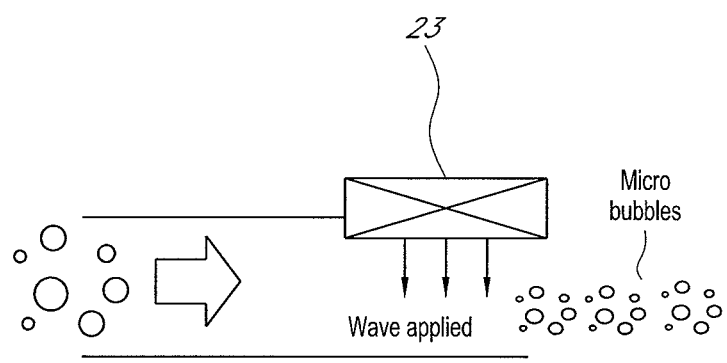
FIG. 6 is a schematic side view of one embodiment of the bubble generator with a supersonic generator.

In some embodiments, the bubble generator may further include a supersonic wave generator 23 which generates supersonic waves. As illustrated in FIG. 6, by applying the generated supersonic waves on the liquid containing bubbles, it is possible to collapse the air bubbles into air bubbles with smaller diameters. The supersonic waves may additionally cause cavitations.

Liquid Tank

With reference to FIG. 1, an embodiment of a liquid tank is illustrated. The liquid tank 5 contains a liquid 6 for purifying the air. In some embodiments, the liquid tank contains a tank inlet port 7 coupled to the generator outlet port 4 of the bubble generator 3. At the tank inlet port 7, the air bubbles are dispersed and the air bubbles are exposed to the liquid 6 to efficiently transfer the impurities contained in the air bubbles to the liquid 6. In some embodiments, the liquid 6 may be water. Water is widely available with easy access and a reasonable cost compared to other liquid material, which enables easy maintenance as a purifying filter and portability of the liquid tank.

Figure 7:
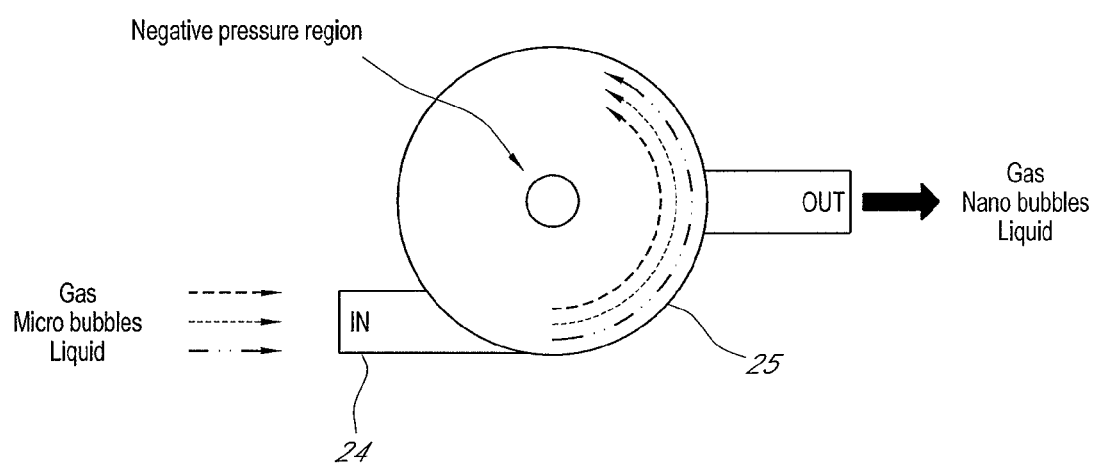
FIG. 7 is a schematic side view of one embodiment of the liquid tank showing a liquid circulating mechanism which causes a centrifugal force towards a negative pressure region.
Figure 8:
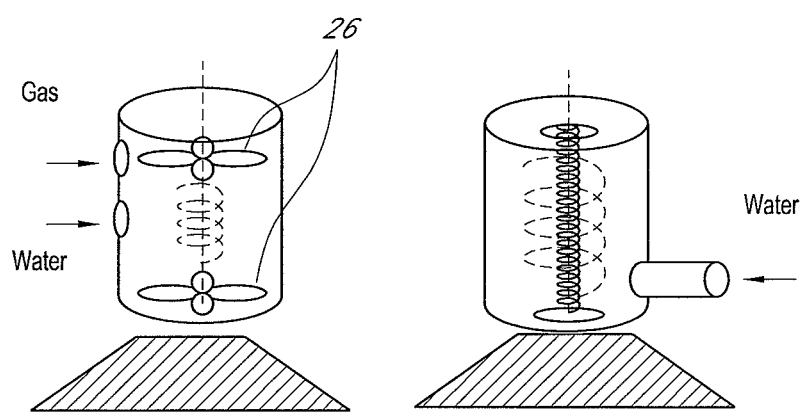
FIG. 8 includes schematic side views of one embodiment of the liquid tank showing propellers for circulating liquid.

The air bubbles generated in the bubble generator can be further collapsed into small sizes of air bubbles. For this purpose, the purifier may further contain circulating unit 25 for circulating the liquid 6, equipped either inside or outside of the liquid tank 5. As illustrated in FIG. 7, the circulating unit 25 collapses the generated air bubbles into smaller sizes by circulating the liquid containing the air bubbles introduced from the input side 24, to the liquid tank 5. In this type of embodiments, the circular flow from the input side 24 to the liquid tank 5 causes a centrifugal force towards a negative pressure region in the center of the circulating liquid. The liquid containing the air bubbles are divided into several layers according to different specific gravities of materials due to the centrifugal force. While these air bubbles are divided, the air bubbles are also sheared, and collapsed into smaller bubbles, so called "nano bubbles." In this shearing process, due to frictions between liquid molecules and air bubbles and electrostatic polarization, the air bubbles may be electrically charged to have a negative potential. This negative charging of air bubbles may be observed throughout any bubble generating processes, not limited to this shearing process. For example, the circulating unit 25 for circulating the liquid can be the liquid tank may have one or more stirring elements inside the liquid tank which circulate the liquid. The stirring elements can be propellers 26, as illustrated in FIG. 8. Alternatively, the circulating unit 25 for circulating the liquid can be a water jet system at the input side 24 in FIG. 7, which introduces external liquid into the liquid tank to circulate the liquid. In some embodiments, the liquid tank may contain a gas inlet port at the input side 24 in FIG. 7 as the circulating unit 25, which introduces external gas into the liquid tank in order to circulate the liquid. In another embodiment, the liquid tank may have a pump either inside or outside of the liquid tank which circulates the liquid. In another embodiment, the liquid tank may have a heater either inside or outside of the tank, which heats liquid inside the tank in a manner to cause a convective flow to circulate the liquid. Alternatively, the liquid tank may have a supersonic vibrator which vibrates the liquid in order to further collapse microair bubbles into nano bubbles.

Figure 9:
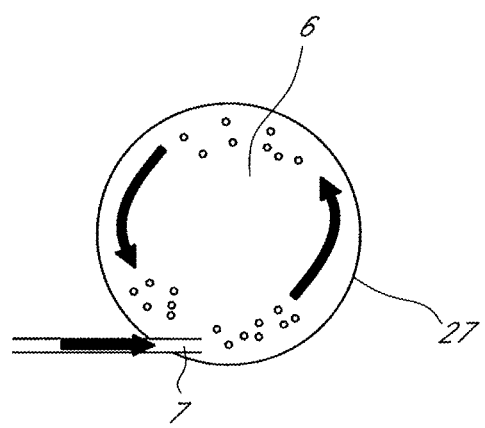
FIG. 9 is a schematic side view of one embodiment of the liquid tank including a circular cross section, where the air bubbles are introduced in a tangential direction to the circular cross section.

Additionally, the liquid tank may contain a circular cross section 27 as illustrated in FIG. 9. This circular cross section 27 is coupled to the tank inlet port 7 which introduces the air bubbles in a tangential direction to the circular cross section 27. This flow circulation is intended to further circulate air bubbles in order to efficiently dissolve impurities into the liquid for air purification. At the tank inlet port 7, the air bubbles are dispersed and the air bubbles are exposed to the liquid 6 to efficiently transfer the impurities contained in the air bubbles to the liquid 6.

The liquid tank 5 may be further applied an electrically negative potential within a reasonable distance from the positive electrode 8, in order to repel the air bubbles with negative electrical charges from the liquid tank 5. In some embodiments, as illustrated in FIG. 1, the liquid tank 5 may be coupled to a negative terminal 10. For example, a bottom or at least one side of the liquid tank 5 may be coupled to the negative terminal 10. Alternatively, the whole portion of the liquid tank 5 is possible to be coupled to the negative terminal 10. In some embodiments, the liquid tank 5 may further contain a negative electrode. For example, the bottom or at least one side of the liquid tank 5 may be the negative electrode. It is possible to have the whole portion of the liquid tank 5 as the negative electrode.

Because air bubbles having a bubble diameter of 50 μm or less (including micro and nano scale air bubbles) tend to be negatively charged in the liquid, the air bubbles in the liquid tank are attracted to the positive electrode 8 and attach to it. The bubbles attached to the positive electrode 8 effectively lose their net negative charge, no longer repel one another, and therefore tend to merge or coalesce into larger bubbles. This formation of larger air bubbles accelerates their ascending speed, and thus, defoaming is accomplished faster. In this manner, it is possible to increase the air through-put in the purifier. Furthermore, in some embodiments, the potential of the positive electrode 8 may be adjusted, in order to control the rate at which the fine air bubbles are attracted to the electrode. A range of the magnitude of the potential of the positive electrode may be from about 1 V to 100 V. In one embodiment, the range of the magnitude of the potential of the positive electrode may be about 5 V to 20 V.

The device for adjusting the electrical potential of the electrode may generally be any electrical potential adjusting device including, for example, a dynamic voltage regulator, a step-up/down voltage controller, or any devices known in the art for adjusting electrode potential. The device could be implemented wither by hardware or software. In one embodiment, a direct current (DC) power source may be employed in order to apply a voltage to the positive electrode. Depending on the amount of air bubbles attached to the positive electrode, it is possible to have a large electric current may flow around the positive electrode. To prevent any damages to the positive electrode and its peripheral circuitry connected due to the large electric current, a current regulator, such as a current regulative diode may be used.

As described herein, fine air bubbles which normally tend to be stably suspended in liquid, and difficult to defoam, are attracted to the positive electrode 8 and collected into air bubbles having larger diameters, which are extracted from the liquid 6 as the larger bubbles rise to the liquid surface and join the purified air 11 in the head space of the tank, from which the purified air 11 may be forcibly blown out of the device. In this manner, the defoaming speed of fine bubbles can be significantly increased. In some embodiments, the air purifier using air bubbles can be compact and high-throughput, due to this increased defoaming efficiency.

Positive Electrode

With reference to FIG. 1, a positive electrode 8 disposed within the liquid 6 is described. The positive electrode can be located at the upper portion of the liquid tank 5. In some embodiments, the positive electrode 8 is coupled to a positive terminal 9 as illustrated in FIG. 1. Thus, a positive potential may be applied to the positive electrode 8 by coupling to the positive terminal 9. A range of the magnitude of the positive potential applied to the positive electrode can be between about 1 V and 100 V. In one embodiment, the range of the magnitude of the potential of the positive electrode may be about 5 V to 20 V. Defoaming is achieved by electrostatic attraction and collection of the air bubbles at the positive electrode 8.

In some embodiments, the positive electrode further charges the negatively charged air bubbles to positively charged air bubbles, and allows the positively charged air bubbles and the negatively charged air bubbles coalesced into larger air bubbles. Here, the attracted air bubbles may be positively charged by the positive electrode, and the negatively charged air bubbles approaching the positive electrode and the positively charged air bubbles around the positive electrodes. In some embodiments, the positive electrode may neutralize the negatively charged air bubbles and allow the neutralized charged air bubbles and the negatively charged air bubbles coalesced into larger air bubbles.

In order to extract the fine air bubbles suspended in the liquid with high efficiency, various shapes of the positive electrode may be used. For example, the positive electrode may have one or more slits or other openings. It is desirable in some embodiments to have the width of the one or more slits smaller than $1.0 \times 10^{-2}$ m. Instead of the slits, it is possible to have one or more holes. To achieve the similar effect, it is preferable to have the diameter smaller than $1.0 \times 10^{-2}$ m. In another embodiment, the positive electrode may be in the form of a planer mesh. It is possible to have the positive electrode having a spherical mesh. It is also possible to have the positive electrode in the form of a honeycomb mesh. The same effect can also be achieved by using the positive electrode in the form of metallic nonwoven fabric which allows air bubbles to pass therethrough. These varieties of shapes of the positive electrode allow the air bubbles to pass through the positive electrode with fewer obstacles. Alternatively, it is possible to have the positive electrode in the form of one or more pins in order to have large areas on their surface to attach more air bubbles, in comparison with the actual area occupied by the positive electrode.

The material of the positive electrode 8 may contain one of gold (Au), silver (Ag), copper (Cu), platinum (Pt), aluminum (Al), nickel (Ni), titanium (Ti), zinc (Zn), chromium (Cr), tungsten (W), iron (Fe), tin (Sn), lead (Pb), cobalt (Co), molybdenum (Mo), iridium (Ir), indium (In), ruthenium (Ru), rhodium (Rh), cadmium (Cd), palladium (Pd), graphite, carbon, diamond, indium tin oxide (ITO), zinc oxide (ZnO) and a combination thereof. The positive electrode 8 attracts the air bubbles, and allows the negatively charged air bubbles coalesced into larger air bubbles.

In some embodiments, the liquid tank may be made of gold (Au), silver (Ag), copper (Cu), platinum (Pt), aluminum (Al), nickel (Ni), titanium (Ti), zinc (Zn), chromium (Cr), tungsten (W), iron (Fe), tin (Sn), lead (Pb), cobalt (Co), molybdenum (Mo), iridium (Ir), indium (In), ruthenium (Ru), rhodium (Rh), cadmium (Cd), palladium (Pd), graphite, carbon, diamond, indium tin oxide (ITO), zinc oxide (ZnO) a steel alloy, an alloy of aluminum and magnesium, die-castings and a combination thereof. In other embodiments, the tank may be made of a plastic material.

Method for Purifying Air

A method of purifying air with a bubble generator described herein can include the steps of dispersing the air to be purified in liquid in the form of fine air bubbles so that pollutants such as hazardous substances, dust, etc., contained in the air can be trapped in the liquid. To improve the efficiency of a cleansing effect of trapping the pollutants from the air, the method may adopt generating air bubbles having a diameter of about 50 μm or less, so called "micro bubbles," and a negative electrical charge. It is also desirable in some embodiments to have the diameter of the air bubbles about 1 μm or less, so called "nano bubbles."

In particular, nano bubbles in the liquid demonstrate cleansing and sterilizing effects due to their electrostatic polarization. The electrostatic polarization due to the interactions between hydrogen bonds is likely to lead to effects similar to effects of surfactants, namely, separation of pollutants from the air and eradication of bacteria, viruses, etc in the air. This eradication effect is explained by two characteristics of micro/nano bubbles. One is their negative electrical charges, and the other is that the micro/nano bubbles sometimes burst, producing free radicals having very high energy. It is theorized that the eradication effect is achieved by a mechanism in which bacteria, viruses, etc. are first attracted by the electrostatic force of the negatively charged micro/nano bubbles and are then destroyed by the free radicals produced when the micro/nano bubbles burst.

Figure 11:
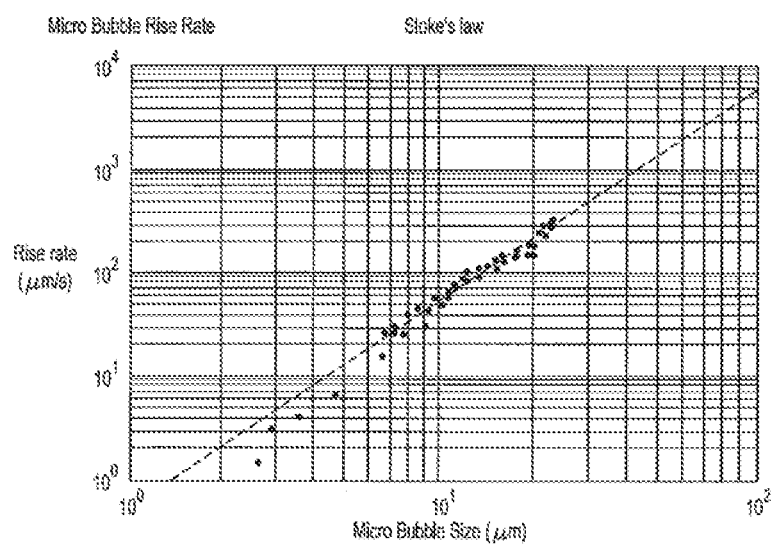
FIG. 11 is a graph showing an increase in bubble rise rate through liquid with increased bubble size.

To increase efficiency of the above cleansing and sterilizing effects, it is desirable in some embodiments to increase areas of air-liquid contact by collapsing air into air bubbles that are as fine as possible. It is known that a behavior of bubbles having a diameter of 50 μm or less differs from that of bubbles having larger diameters. For example, when a surface area of an air bubble of micro/nano-size at an interface between the air and the liquid is considerably larger per volume than that of an air bubble of millimeter-size, interfacial tension, cohesive energy at the interface, due to an imbalance of forces between the air and the liquid, becomes larger accordingly. The interfacial tension increases internal pressure of the air bubbles which causes several effects. First, it is possible to enhance chemical reactions for decomposing pollutants due to high internal pressure. Furthermore, due to the interfacial tension, the air bubble of micro/nano-size shrinks almost in an indefinite manner to be suspended in the liquid in a stable manner, instead of floating up through the liquid to the air. As the air bubbles become finer, the buoyant forces applied to the air bubbles from surrounding liquid decrease, and the internal pressure of the air bubbles become more dominant, accordingly. These small buoyant forces and the dominant interfacial tension effects are so called "high pressure effect" which also results in increased stability of the air bubbles in the liquid which keeps the air bubbles suspended in the water for a long period of time, in accordance with Stoke's law, shown in FIG. 11. For example, an air bubble having the diameter of 10 μm ascends only about 40-50 mm/second. This causes difficulty in directly extracting the air bubbles again as a mass of air, resulting in lower air flow rate, or throughput, from defoaming, which has been an issue for efficient air purification. This is an issue in the bubble type air purifiers, due to the stability of micro-nano bubbles in liquid.

Figure 10A:
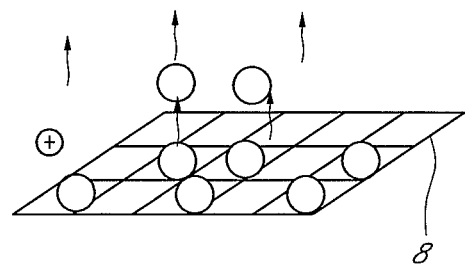
FIG. 10A is a schematic perspective view of one embodiment of a positive electrode, showing air bubbles coalesced into larger bubbles and released into air.
Figure 10B:
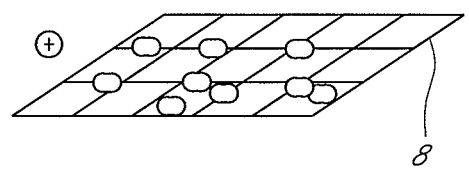
FIG. 10B is a schematic perspective view of one embodiment of a positive electrode, showing that air bubbles are attached to the positive electrode and coalesced into larger bubbles.
Figure 10C:
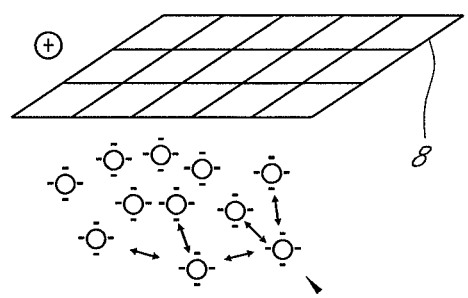
FIG. 10C is a schematic perspective view of one embodiment of a positive electrode, showing negatively charged air bubbles repelling each other in liquid.

Since the micro/nano air bubbles are negatively charged, as described above, the air bubbles to repel one another, as illustrated in FIG. 10C, thus the micro/nano air bubbles are difficult to be coalesced and float up through the liquid and the air bubble concentration remains almost the same. However, it is possible to use the negative electrical charges of the micro/nano air bubbles to control the micro/nano air bubbles' defoaming speed by controlling the negative electrical charges of the micro/nano air bubbles by a positive electrode 8 as illustrated in FIG. 10B, after the cleansing and sterilization process progresses in the micro/nano bubbles. By controlling the defoaming speed by controlling the negative electrical charges, it may be possible to efficiently collect micro-nano bubbles coalesced at the positive electrode 8 into larger bubbles as shown in FIG. 10A, wherein the larger bubbles float faster upward through the liquid and subsequently merge into the air in the tank head space.

Accordingly, the method of purifying air with a bubble generator, involves introducing air to be purified into a bubble generator, generating negatively charged air bubbles having a diameter of about 50 μm or less from the air, releasing the air bubbles into a liquid in a liquid tank, wherein impurities in the air within the air bubbles are absorbed and/or dissolved into the liquid, and attracting the air bubbles to a positive electrode. It is desirable in some embodiments to have the diameter of the air bubbles about 1 μm or less to cause the high pressure effect and cleansing and sterilizing effects due to the electrostatic polarization. In some embodiments of the purifying method, it allows the attracted air bubbles to coalesce into larger air bubbles, as illustrated in FIG. 10B.

In some embodiments, negatively charged air bubbles may be generated by generating a vortex of air bubbles suspended in the liquid and subsequently disrupting the vortex to create the bubbles. For example, as illustrated in FIG. 2, the air from atmosphere is injected into the liquid to generate air bubbles suspended within the liquid, and one or more pivotal plates 13 are disposed within a flow path of the air bubbles suspended within the liquid. In this type of the bubble generator, air bubbles in a vortex flow collapse into finer bubbles as the pivotal plates 13 disrupts the vortex. In FIG. 2, a vortex is generated by causing a mixture of liquid and a gas to vigorously collide with a fixed pivotal plate 13. When the vortex is disrupted and broken, the air bubbles in the vortex collapse into finer bubbles. Alternatively, it is possible to disrupt the vortex by using a break-down nozzle attached to the liquid tank side end of the bubble generator instead of having the pivotal plates, in order to generate the air bubbles, as illustrated in FIG. 5. Where the nozzle 20 contains a constriction section 21 which constricts mixture of the air and the liquid to cause the vortex, and a vortex disrupting section 22 which disrupts the vortex in order to generate micro bubbles, the similar effects of generating air bubbles are expected.

In another embodiment, negatively charged air bubbles can be generated by compressing the air, merging the compressed air and the liquid to disperse a portion of the compressed air in the liquid, and releasing the compressed air as the air bubbles dispersed in the liquid. For example, as illustrated in FIG. 3, the air is taken from atmosphere and compressed, while the liquid is introduced from the liquid tank 5 into the pressure tank 16 by a pump 15. The compressed air and the introduced liquid are merged at the pressure tank 16, and dispersed as the air bubbles into the liquid tank 5.

In some embodiments, as illustrated in FIG. 4, the air is released as the air bubbles dispersed in the liquid through a microporous membrane 19 of a porous nozzle 18 disposed within the liquid. This method can be employed together with supersonic waves generated and applied to collapse the air bubbles into air bubbles with smaller diameters as illustrated in FIG. 6. It is also possible for the supersonic waves to cause cavitations.

In some embodiments, the liquid introduced into the liquid tank is circulated in the liquid tank around the positive electrode, in order to efficiently transfer the impurities contained in the air bubbles to the liquid 6. As illustrated in FIG. 7, the generated air bubbles are collapsed into smaller sizes while circulating the liquid containing the air bubbles introduced from the input side 24, to the liquid tank 5. As a result, a centrifugal force towards a negative pressure region in the center of the circulating liquid is caused due to the circular flow from the input side 24 to the liquid tank 5. While the centrifugal force is applied to these air bubbles, the air bubbles are sheared and collapsed into nano bubbles. Mainly in this shearing process, due to frictions between liquid molecules and air bubbles and electrostatic polarization, the air bubbles may be electrically charged to have a negative potential.

For example, it is possible to have one or more propellers 26 in the liquid tank as illustrated in FIG. 8, for circulating the liquid. Alternatively, it is possible to introduce external liquid into the liquid tank to circulate the liquid by a water jet system at the input side 24 in FIG. 7. In another embodiment, it may introduce external gas into the liquid tank in order to circulate the liquid at the input side 24 in FIG. 7. Yet in another embodiment, the liquid tank may have a pump either inside or outside of the liquid tank which circulates the liquid by applying an extra pressure. In another embodiment, the circulation can be achieved by heating liquid inside the tank in a manner to cause a convective flow in order to circulate the liquid. Alternatively, it is possible to vibrate the liquid in the liquid tank with supersonic waves, in order to further collapse the air bubbles into nano bubbles.

Additionally, the liquid tank may contain a circular cross section 27 as illustrated in FIG. 9. In this structure, this circular cross section 27 is able to release the air bubbles into the liquid tank a tangential direction to the circular cross section 27. By this circular flow, the air bubbles are exposed to the liquid in a faster speed, thus it is possible to efficiently transfer impurities in the air bubbles into liquid for purification.

A defoaming process includes forcible collection of the air bubbles coalescing at the positive electrode 8 by the positive electrode 8. In some embodiments, a speed of the defoaming, namely, absorbing the air bubble at the positive electrode may be controlled by adjusting a potential of the positive electrode. For example, in order to ensure sufficient time for purifying highly polluted air, the potential of the positive electrode can be adjusted to a lower amount, thus resulting air bubbles suspended longer in the liquid until the air bubbles are cleansed and sterilized by exposed to the liquid for a sufficiently long period. On the contrary, if the purifying process needs to be executed in a short period of time, a higher potential may be applied to the positive electrode, so that even a relatively compact-sized apparatus may achieve a high throughput without any extra liquid tank. Furthermore, it is possible to control the adjustment of the potential of the positive electrode by a dynamic voltage regulator, or a step-up/down voltage controller, but not limited to these examples. In this manner, the speed of the entire purifying process including the cleansing and sterilizing process as well as the defoaming process can be controlled, according to a degree of pollution and a desirable time of purification, while achieving compactness of the air purifier.

In some embodiments, the liquid may be water. Water is widely available with easy access and a reasonable cost compared to other liquid material, which enables easy maintenance and portability of the liquid tank. Because the purification process is due to the cleansing and sterilization effects of negatively charged air bubbles, ordinary water may be effectively used as a filter for a long period of time, instead of using any specific liquids or agents.

In some embodiments, it is possible to use electrolyzed water instead of ordinary water. Electrolyzed water may be an alkaline solution including sodium hydroxide, or a solution of sodium hypochlorite (NaClO), a solution of hypochlorous acid, a mixture of a combination thereof. These solutions are efficient disinfectants, which typically destroy microorganisms and while being less harmful to humans. In some embodiments, the liquid may be alcohol. For example, it is possible to use alcohol, such as ethanol or butyl alcohol. In some embodiments, the liquid may be a mixture of the alcohol diluted in water. Alcohol and alcohol solutions are efficient disinfectants, which typically destroy microorganisms, having advantages of non-corrosiveness. By including electrolyzed water or alcohol in the liquid, cleansing and disinfecting effects in the liquid may be improved.

In some embodiments, other liquids or solvent systems may be used, depending on the nature of the impurities to be removed from the air. After use, the liquid can be removed and disposed of properly. The liquid tank can be refilled with fresh liquid.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

Additional embodiments are disclosed in further detail in the following examples, which are not in any way intended to limit the scope of the claims.

Example 1

Construction of an Air Purifier with a Bubble Generator

An air purifier that includes an air intake vent, a bubble generator coupled to air intake vent and having a generator outlet port, a water bath having a tank inlet port fluidly connected to the generator outlet port of the bubble generator, water in the water bath for purifying the air by dissolving volatile organic compounds, a positive electrode installed in the water bath and disposed in the water is provided. The bubble generator employs a hydrodynamic mechanism where the bubble generator contains an injector coupled to the air intake vent which injects air into the water, and a fixed pivotal plate disposed within a flow path of the micro air bubbles. A vortex is generated by causing a mixture of water and air to vigorously collide with the fixed pivotal plate. The air in bubbles in a vortex flow further collapses into finer bubbles, as a result, micro bubbles having a diameter of 50 µm or less are formed.

The water bath is made of stainless steel, a steel alloy with chromium, so that the liquid tank is light-weight for portability. The water bath contains a plurality of propellers which can further collapse the micro bubbles into nano bubbles having a diameter of 1 µm or less.

The positive electrode is made of platinum(Pt), and applied a positive potential, by coupling to a positive terminal which is further coupled to a voltage regulator where the positive potential is adjusted. In this water bath, the nano bubbles with negative electrical charges are attracted to the positive electrode, and coalesce into air bubbles having larger diameters. As a result, the larger air bubbles are forcibly extracted from the water as large bubbles. In this manner, the defoaming rate of fine bubbles can be significantly increased while the air purifier using micro-nano bubbles can be compact and high-throughput.

Example 2

Use of an Air Purifier with a Bubble Generator to Purifying Air

Air containing volatile organic compounds (VOC) is introduced into a bubble generator which generates negatively charged air bubbles having a diameter of about 50 µm or less. The air bubbles are released into water in a water bath. The air bubbles are further circulated and collapsed into nano bubbles in the water bath. The VOC within the nano bubbles are absorbed into water in the water bath, due to the high pressure effect and cleansing and sterilizing effects due to the electrostatic polarization particular to nano bubbles. The nano bubbles after cleansing and sterilizing are attracted to a positive electrode having a positive potential by the positive electrode. The attracted bubbles are further coalesced into larger air bubbles at a positive electrode and released as purified air. The water can be removed from the air purifier and properly disposed of according to the types of VOCs contained in the water.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An air purifier, comprising:
  an air intake vent;
  a bubble generator coupled to the air intake vent and further comprising a generator outlet port; and
  a liquid tank comprising:
    a liquid disposed within the liquid tank for purifying the air within air bubbles by dissolving impurities;
    a tank inlet port coupled to the generator outlet port of the bubble generator and further configured to disperse the air bubbles in the liquid; and
    an electrode having a first type of electrical charge disposed within the liquid,
    wherein the bubble generator is configured to generate the air bubbles having a second type of electrical charge in the liquid disposed within the liquid tank, the second type of electrical charge being different from the first type of electrical charge, and
    wherein the electrode is configured to attract the air bubbles having the second type of electrical charge suspended within the liquid.

2. The air purifier of claim 1, wherein the bubble generator is further configured to generate air bubbles having a diameter of about 50 μm or less into the liquid in the liquid tank.

3. The air purifier of claim 1, wherein the bubble generator comprises:
  an injector coupled to the air intake vent and configured to inject air into the liquid to generate air bubbles suspended within the liquid; and
  one or more pivotal plates disposed within a flow path of the air bubbles suspended within the liquid, such that a vortex is generated.

4. The air purifier of claim 1, wherein the bubble generator comprises:
  a compressor configured to compress the air from the air intake vent;
  a pump configured to introduce the liquid from the liquid tank into the bubble generator; and a pressure tank coupled to the compressor and the pump, wherein the pressure tank comprises a nozzle configured to disperse the compressed air in the form of air bubbles into the liquid.

5. The air purifier of claim 3, wherein the bubble generator further comprises a nozzle configured to disrupt the vortex to generate microbubbles.

6. The air purifier of claim 1, wherein the bubble generator further comprises a supersonic wave generator configured to generate supersonic waves to collapse the air bubbles into air bubbles with smaller diameters.

7. The air purifier of claim 1, wherein the liquid tank has a circular cross section, and the tank inlet port is configured to introduce the air bubbles in a tangential direction to the circular cross section.

8. The air purifier of claim 1, wherein the electrode comprises one or more holes.

9. The air purifier of claim 8, wherein the diameter of the one or more holes is smaller than $1 \times 10^{-2}$ m.

10. The air purifier of claim 1, wherein the liquid tank is further coupled to a negative terminal.

11. A method of purifying air, the method comprising:
introducing air to be purified into a bubble generator;
generating negatively charged air bubbles having a diameter of about 50 μm or less from the air;
releasing the air bubbles into a liquid in a liquid tank, wherein impurities in the air within the air bubbles are absorbed into the liquid; and
attracting the air bubbles to a positive electrode.

12. An air purifier tank comprising:
a liquid disposed within the air purifier tank;
a tank inlet port in fluid communication between a bubble generator and the liquid, the tank inlet port configured to allow the bubble generator to generate negatively charged air bubbles in the liquid disposed within the air purifier tank and disperse the negatively charged air bubbles into the liquid disposed within the air purifier tank; and
a positive electrode disposed within the liquid, wherein the positive electrode is configured to attract the negatively charged air bubbles suspended within the liquid.

13. The air purifier tank of claim 12, the air purifier tank further comprising one or more propellers configured to circulate the liquid.

14. The air purifier tank of claim 12, the air purifier tank further comprising a water jet system configured to introduce external liquid into the liquid tank to circulate the liquid.

15. The air purifier tank of claim 12, the air purifier tank further comprising a gas inlet port configured to introduce external gas into the liquid tank to circulate the liquid.

16. The air purifier tank of claim 12, the air purifier tank further comprising a circular cross section, and wherein the tank inlet port is configured to disperse the air bubbles in a tangential direction to the circular cross section.

17. The air purifier tank of claim 12, wherein the positive electrode comprises one or more holes configured to allow air bubbles to pass therethrough.

18. The air purifier tank of claim 17, wherein the diameter of the one or more holes is smaller than $1 \times 10^{-2}$ m.

19. The air purifier tank of claim 12, the air purifier tank further comprising a negative electrode.

20. The air purifier tank of claim 12, the air purifier tank further comprising a device for adjusting a potential of the positive electrode thereby controlling a speed of attracting the air bubbles.

21. An air purifier comprising:
a tank configured holding a liquid;
a bubble generator configured to generate negatively charged air bubbles within the liquid;
tank inlet port coupled between the tank and the bubble generator and in fluid communication with the bubble generator, the tank inlet port configured to disperse the negatively charged air bubbles from the bubble generator into the liquid; and
a positive electrode positioned in the tank to attract the negatively charged air bubbles through the liquid.

22. The air purifier of claim 21, wherein the thank is filled with the liquid, wherein the liquid is configured to dissolve impurities within the air bubbles.

23. The air purifier of claim 21, wherein the bubble generator comprises:
an injector coupled to the air intake vent and configured to inject air into the liquid to generate the air bubbles suspended within the liquid; and
one or more pivotal plates disposed within a flow path of the air bubbles suspended within the liquid, such that a vortex is generated.

24. The air purifier of claim 21, wherein the positive electrode comprises one or more holes configured to allow the air bubbles to pass therethrough.

25. The air purifier of claim 1, wherein the liquid tank is filled with the liquid.

26. The air purifier tank of claim 12, wherein the air purifier tank is filled with the liquid, wherein the liquid is configured to dissolve impurities within the air bubbles.

* * * * *

UNITED STATES PATENT AND TRADEMARK OFFICE
CERTIFICATE OF CORRECTION

PATENT NO. : 9,539,586 B2
APPLICATION NO. : 13/641095
DATED : January 10, 2017
INVENTOR(S) : Oda et al.

Page 1 of 1

It is certified that error appears in the above-identified patent and that said Letters Patent is hereby corrected as shown below:

In the Specification

In Column 1, Line 7, delete "§371" and insert -- § 371 --, therefor.

In the Claims

In Column 20, Line 29, in Claim 22, delete "thank is" and insert -- tank is --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*